(12) United States Patent
Seung (10) Patent No.: US 10,632,786 B2
(45) Date of Patent: Apr. 28, 2020

(54) HONEYCOMB RIM-TYPE WHEEL

(71) Applicant: HANDS CORPORATION LTD.,
Incheon (KR)

(72) Inventor: Hyeon-Chang Seung, Seoul (KR)

(73) Assignee: HANDS CORPORATION LTD.,
Incheon (KR)

( * ) Notice: Subject to any disclaimer, the term of this patent is extended or adjusted under 35 U.S.C. 154(b) by 0 days.

(21) Appl. No.: 15/773,932

(22) PCT Filed: May 4, 2016

(86) PCT No.: PCT/KR2016/004684
§ 371 (c)(1),
(2) Date: May 4, 2018

(87) PCT Pub. No.: WO2017/078233
PCT Pub. Date: May 11, 2017

(65) Prior Publication Data
US 2018/0319208 A1 Nov. 8, 2018

(30) Foreign Application Priority Data

Nov. 5, 2015 (KR) .......................... 10-2015-0154898

(51) Int. Cl.
*B60B 21/02* (2006.01)
*B60B 1/00* (2006.01)
*B60B 1/08* (2006.01)

(52) U.S. Cl.
CPC ............. *B60B 21/026* (2013.01); *B60B 1/00* (2013.01); *B60B 1/08* (2013.01);
(Continued)

(58) Field of Classification Search
CPC ..... B60B 21/00; B60B 21/026; B60B 21/062; B60B 21/025
See application file for complete search history.

(56) References Cited

U.S. PATENT DOCUMENTS 5,826,949 A 10/1998 Bortoloni
6,234,581 B1 5/2001 Stach
(Continued)

FOREIGN PATENT DOCUMENTS

EP 0026514 A1 4/1981
EP 1557292 A1 7/2005
(Continued)

OTHER PUBLICATIONS

Machine translation of JP11-192804, 11 pages (Year: 1999).*
(Continued)

*Primary Examiner* — Jason R Bellinger
(74) *Attorney, Agent, or Firm* — Harness, Dickey & Pierce, P.L.C.

(57) ABSTRACT

The present invention relates to a wheel having a rim portion including an air-tight rim formed in a cylindrical shape, and a protruded grid portion having a plurality of first recesses by being protruded from and equally spaced around the circumference of the air-tight rim. In this way, the honeycomb rim-type wheel can be readily manufactured to have lightweight using a single casting without sacrificing durability thanks to the protruded grid portion on the circumference of the air-tight rim, thereby reducing time and cost for manufacturing by reduced usage of molten metal.

2 Claims, 6 Drawing Sheets

(52) U.S. Cl.
CPC ... *B60B 2310/202* (2013.01); *B60B 2900/111* (2013.01); *B60B 2900/112* (2013.01); *B60B 2900/113* (2013.01); *Y02T 10/86* (2013.01)

(56) References Cited

U.S. PATENT DOCUMENTS

| | | | |
|---|---|---|---|
| 7,922,261 B2* | 4/2011 | Gartner | B60B 1/08 301/95.101 |
| 2005/0212350 A1 | 9/2005 | Yamamoto et al. | |

FOREIGN PATENT DOCUMENTS

| | | |
|---|---|---|
| EP | 2527160 A1 | 11/2012 |
| JP | H11192804 A | 7/1999 |
| JP | 2011148405 A | 8/2011 |
| KR | 10-1998-0018993 A | 6/1998 |
| KR | 10-2000-0022221 A | 4/2000 |
| KR | 10-0460655 B1 | 4/2005 |
| KR | 10-2006-0044653 A | 5/2006 |
| KR | 10-2007-0045800 A | 5/2007 |
| KR | 10-2007-0053380 A | 5/2007 |
| KR | 10-2013-0044465 A | 5/2013 |
| KR | 10-2014-0001559 A | 1/2014 |
| KR | 10-2014-0101221 A | 8/2014 |

OTHER PUBLICATIONS

International Search Report and Written Opinion issued in PCT/KR2016/004684, dated Aug. 11, 2016; ISA/KR.
Extended European Search Report for corresponding EP Application No. 16862252.0 dated Jun. 6, 2019.

* cited by examiner

| Type 1, a thickness of an air-tight rim 4mm, no protruded grid portion ||||
|---|---|---|---|
| | Impact Test | Driving Test | Rotational Fatigue Test |
| Top View | | | |
| Bottom View | | | |
| Front View | | | |
| FEA Result | Max Strain : 6.57% | Max Strain : 70.61MPa | Max Strain : 64.17MPa |

|  | Type 1 | Type 2 | Type 3 |
|---|---|---|---|
|  |  |  |  |
| MASS | 14.738Kg | 13.936Kg (−802g) | 13.773Kg (−965g) |
| Impact Test (Max Strain : 10%) | 6.57% (Pass) | 6.81% (Pass) | 6.70% (Pass) |
| Driving Test (Max Strain : 115.2MPa) | 70.61MPa (Pass) | 75.90MPa (Pass) | 73.80MPa (Pass) |
| Rotational Fatigue Test (Max Strain : 151.7MPa) | 64.17MPa (Pass) | 66.50MPa (Pass) | 66.60MPa (Pass) |

FIG. 6

HONEYCOMB RIM-TYPE WHEEL

CROSS REFERENCE TO RELATED APPLICATIONS

This application is a U.S. National Phase Application under 35 U.S.C. 371 of International Application No. PCT/KR2016/004684 filed on May 4, 2016 and published in Korean as WO 2017/078233 A1 on May 11, 2017. This application is claims the benefit of priority from Korean Patent Application No. 10-2015-0154898 filed Nov. 5, 2015. The entire disclosures of the above applications are incorporated herein by reference.

TECHNICAL FIELD

The present invention relates to a honeycomb rim-type wheel, and more specifically, to a honeycomb rim-type wheel that can be readily manufactured in a single casting job and can be made lightweight without sacrificing durability thanks to the protruded grid portion on the circumference of an air-tight rim, thereby reducing time and cost for manufacturing by reduced usage of molten metal.

BACKGROUND

The statements in this section merely provide background information related to the present disclosure and do not necessarily constitute prior art.

In general, a vehicle wheel is secured to an axle through a central portion of a metallic wheel attached with a rubber tire filled with air or nitrogen. Especially in recent years, an aluminum wheel is preferred as it offers a fine design, better fuel efficiency due to lightweight, and better cooling efficiency.

Chassis components of a vehicle are closely related to the performance of the vehicle, and therefore a variety of research and development are performed with a view to reducing the weight of the chassis components. Typically, 1 kg reduction in the chassis components reduces the load on the vehicle suspension by 15 kg when the vehicle is running.

Research and development on the reduction of vehicle weight by forming a hollow portion in the rim or in the spoke of the wheel are known from Korean Patent Publication No. 10-1998-018993, Korean Patent Publication No. 10-2000-0022221, Korean Patent Publication No. 10-2006-0044653, and Korean Patent No. 10-0460655.

DISCLOSURE

Technical Problem

However, the prior arts for reducing the weight of the wheel, forming a hollow in the rim or in the spoke, need to form a cavity to remove the molding sand. Still, removing the molding sand is not an easy task even when the cavity is provided.

Recently, a technology for "A vehicle wheel and manufacturing method thereof" which forms a hollow in the rim of the wheel where a tire is fitted was disclosed in Korean Patent Publication No. 10-2006-0044653.

However, the aforementioned "A vehicle wheel and manufacturing method thereof" relates to a noise reduction technology by forming an air chamber on the rim of a wheel. It complicates the manufacturing process and increases overall weight of the wheel by the added weight of the rim portion having a double-layered structure to provide the air chamber.

Therefore, the applicant of the present invention has developed a honeycomb rim-type wheel capable of reducing the weight without sacrificing durability and ease of manufacturing.

The object of the present invention is to provide a honeycomb rim-type wheel which can be readily manufactured in a single casting job and can be made lightweight without sacrificing durability thanks to the protruded grid portion on the circumference of an air-tight rim, thereby reducing time and cost for manufacturing by reduced usage of molten metal.

SUMMARY

The present invention for achieving the above object discloses a honeycomb rim-type wheel characterized in comprising a hub formed inside the wheel, a rim portion separated outwardly from the hub and forming a circumference on which a tire is fitted, a plurality of spokes connecting the hub and the rim portion, wherein the rim portion is characterized by including an air-tight rim formed in a cylindrical shape, and a protruded grid portion having a plurality of first recesses by being protruded from and equispaced around the circumference of the air-tight rim.

In addition, the present invention discloses the honeycomb rim-type wheel characterized in that the air-tight rim of the rim portion has thickness ranging 1 mm to 1.5 mm, and the protruded grid portion has thickness ranging 2.5 mm to 3 mm, so that the overall thickness of the rim portion including the air-tight rim and the protruded grid portion becomes 4 mm.

In addition, the present invention discloses the honeycomb rim-type wheel characterized in that the protruded grid portion is integrally formed by connecting protruded ring portions which are equispaced around the circumference of the air-tight rim with protruded link portions being disposed of at each upper, lower, left, and right positions having a second recess inside, and a third recess formed by the protruded ring portions and protruded link portions gets into a honeycomb shape by rounding the connecting portions of protruded ring portions and protruded link portions.

The honeycomb rim-type wheel of the present invention can be readily manufactured in a single casting job and can be made lightweight without sacrificing durability thanks to the protruded grid portion on the circumference of an air-tight rim, thereby reducing time and cost for manufacturing by reduced usage of molten metal.

BRIEF DESCRIPTION OF THE DRAWINGS

The drawings described herein are for illustrative purposes only of selected examples and not all possible implementations and are not intended to limit the scope of the present disclosure.

REFERENCE NUMERALS

1: honeycomb rim-type wheel 10: Hub 20: Spokes
100: rim portion
110: air-tight rim
120: grid protrusion 121: first recess 123: protruded ring portion
125: second recess 127: protruded link portion 129: third recess

DETAILED DESCRIPTION

The configuration of the present invention for solving the above problems is as follows.

Figure 1:
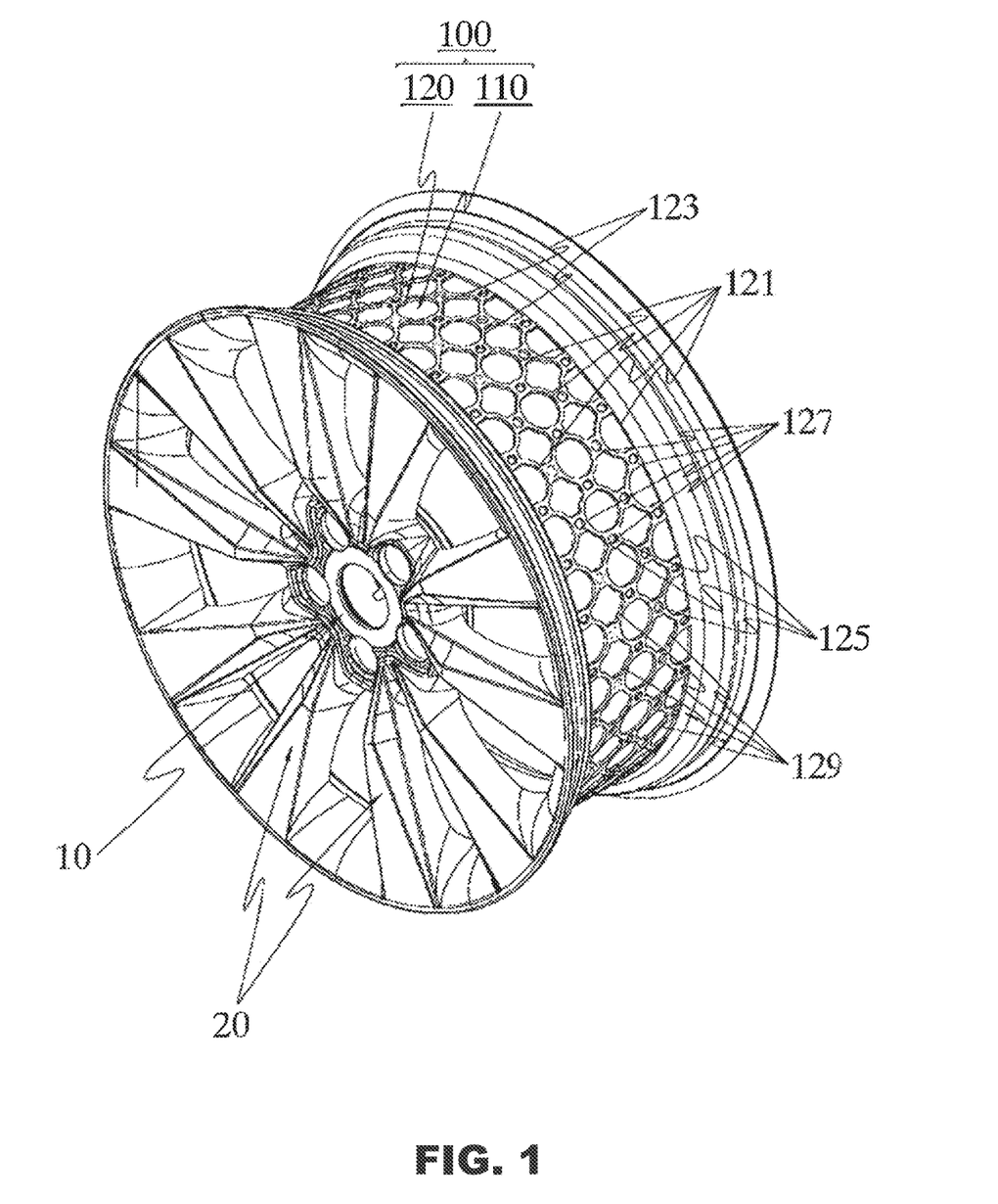
FIG. 1 is a perspective view of a honeycomb rim-type wheel according to the present invention.
Figure 2:
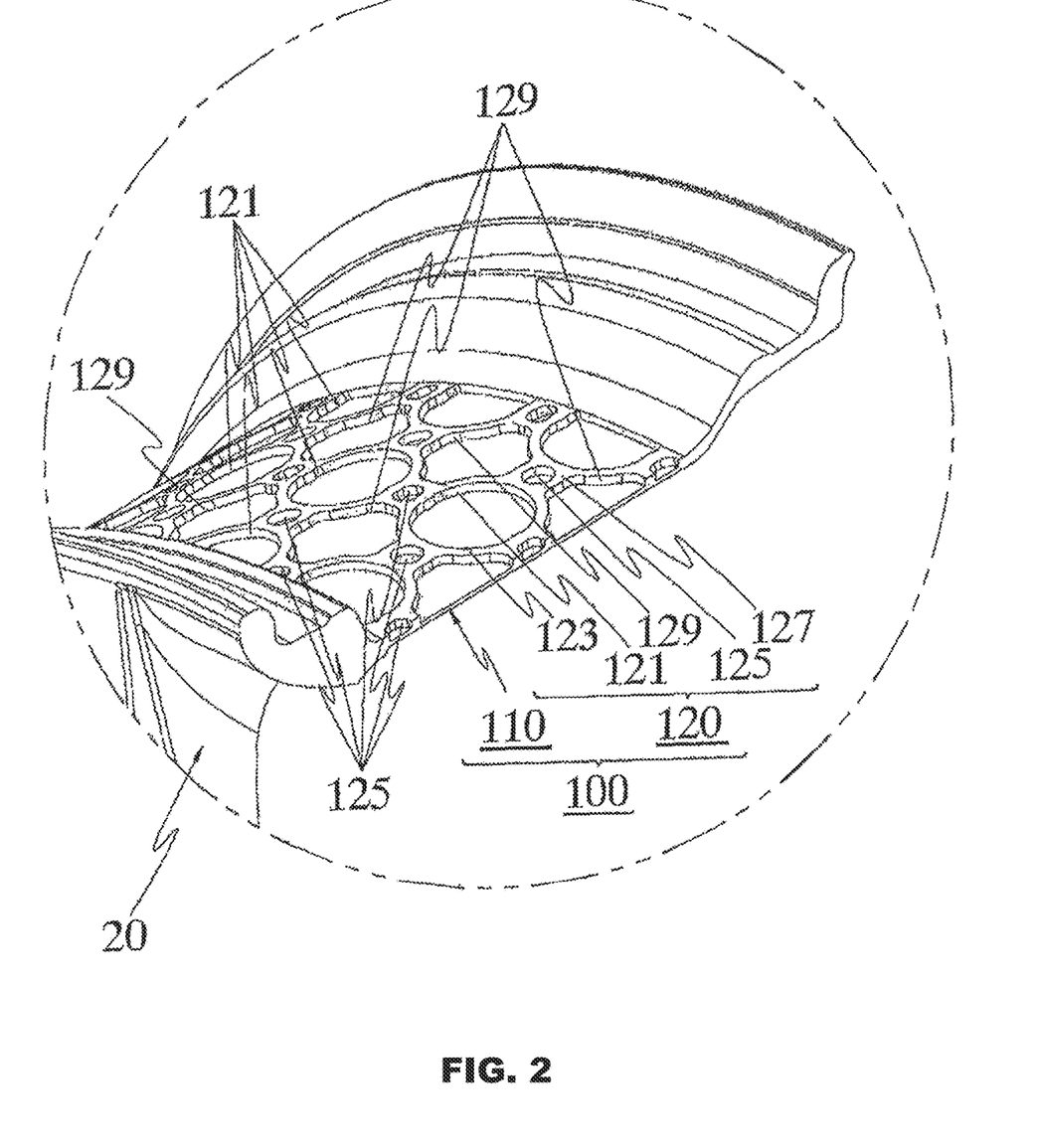
FIG. 2 is a partial enlarged sectional view showing an enlarged cross-sectional view of a honeycomb rim-type wheel of the present invention.
Figure 3:
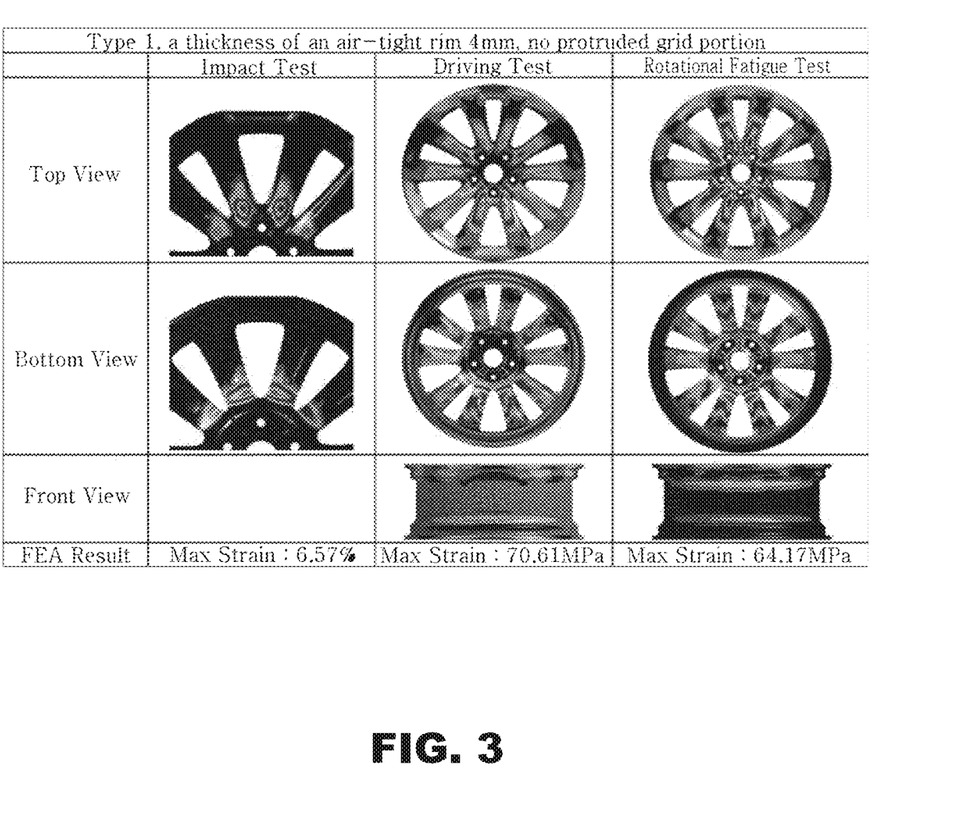
FIG. 3 is a view showing FEA test results on a wheel.
Figure 4:
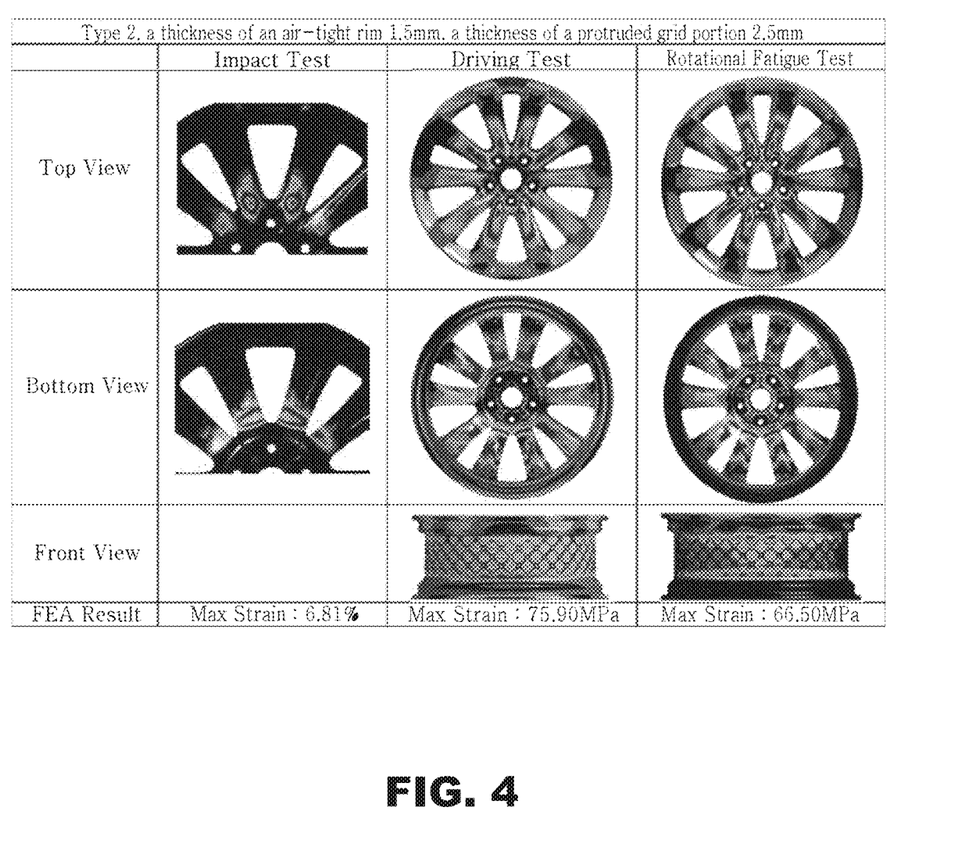
FIG. 4 is a view showing FEA test results on a wheel.
Figure 5:
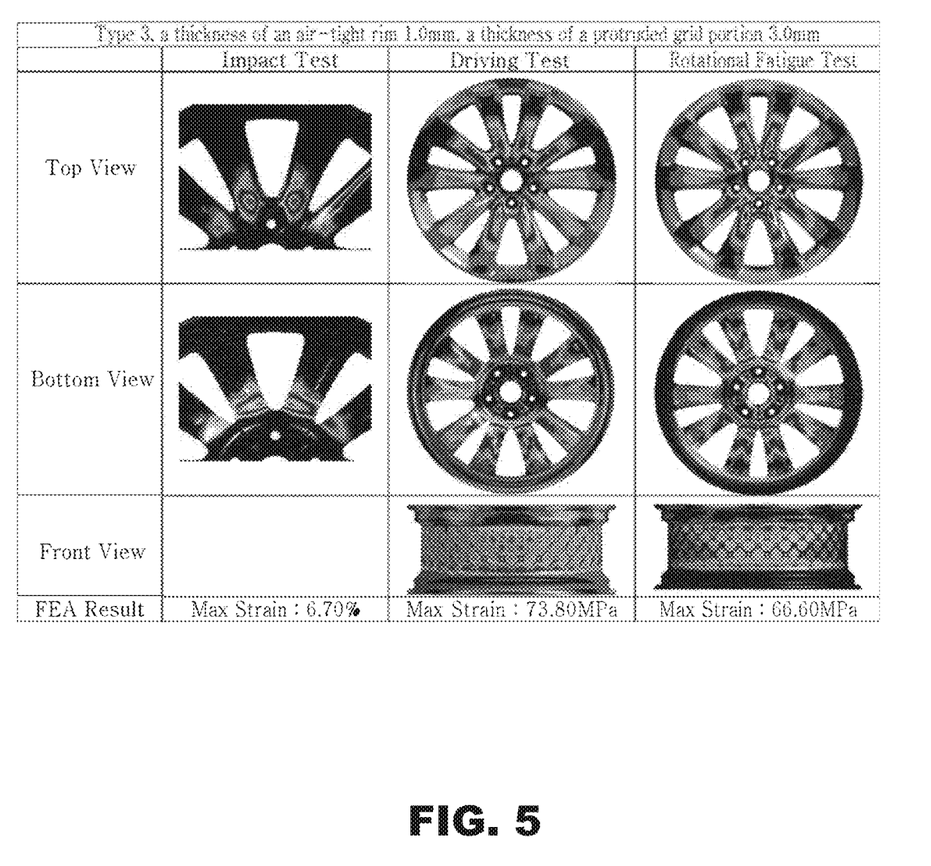
FIG. 5 is a view showing FEA test results on a wheel.
Figure 6:
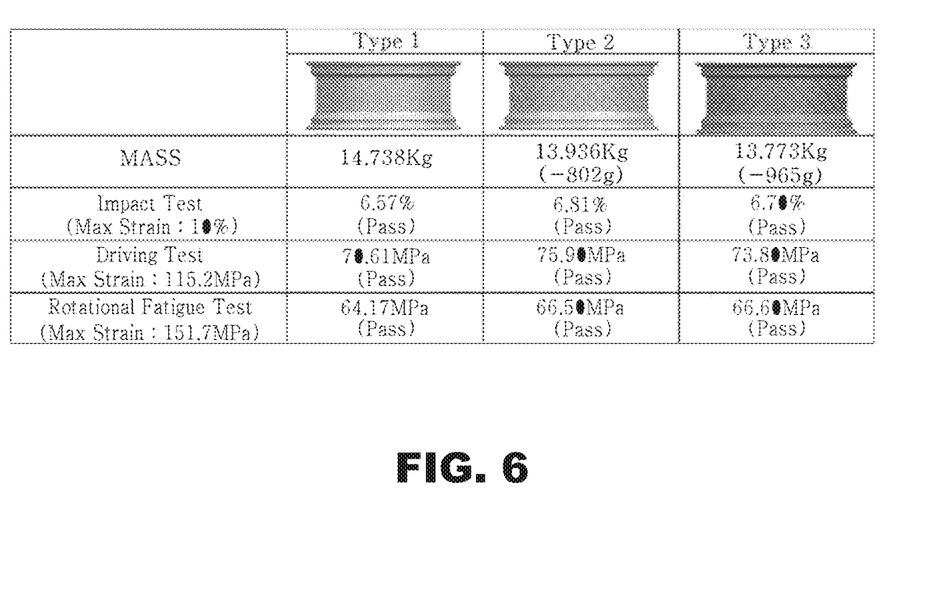
FIG. 6 is a view summarizing the FEA test results.

As shown in FIGS. 1 and 2, the present invention relates to a honeycomb rim-type wheel 1 capable of a weight reduction by forming a honeycomb-shaped rim portion. It is characterized in that it comprises a hub 10 formed inside the wheel 1, a rim portion 100, separated outwardly from the hub 10, forming a circumference on which a tire (not shown) is fitted, a plurality of spokes 20 connecting the hub 10 and the rim portion 100, wherein the rim portion 100 includes an air-tight rim 110 formed in a cylindrical shape, and a protruded grid portion 120 having a plurality of first recesses 121 by being protruded from and equispaced around the circumference of the air-tight rim 110.

The rim portion 100 is a cylindrical part which is covered when a tire is fitted between flanges. Typically, the rim portion 100 may have a 4 mm thickness. However, the cylindrical rim portion 100 of the present invention is characterized in that the thickness of 4 mm is a sum of the thicknesses of the air-tight rim 110 and the protruded grid portion 120. Herein the air-tight rim 110 has a thickness thinner than 4 mm and the protruded grid portion 120 has a plurality of first recesses 121 by being protruded from and equispaced around the circumference of the air-tight rim 110. The wheel can become lighter by the volume reduction of the rim portion 100 by the first recesses 121 in the protruded grid portion 120.

To this end, the present invention provides a feature that the air-tight rim 110 of the rim portion 100 has thickness ranging from 1 mm to 1.5 mm, and the protruded grid portion 120 has thickness ranging from 2.5 mm to 3 mm, so that the overall thickness of the rim portion 100 including the air-tight rim 110 and the protruded grid portion 120 can become 4 mm. Limiting the thickness range of the protruded grid portion 120 between 2.5 mm and 3 mm is to prevent loss of durability while reducing as much weight as possible from the wheel.

In addition, it is preferable that the protruded grid portion 120 has protruded ring portions 123 which are formed in a ring shape and equispaced around the circumference of the air-tight rim 110 so that a circular-shaped first recess 121 can be formed inside the protruded ring portion 123. It is also preferable that each of the protruded ring portions 123 is formed integrally by being connected with protruded link portions 127 having a second recess 125 formed inside and being disposed of at each upper, lower, left and right of the protruded ring portion 123.

Here, a main reason that the protruded ring portions 123 are formed integrally with protruded link portions 127 is to increase the durability of the protruded grid portion 120 by integrally connecting the protruded ring portions 123 which are configured to have a ring shape to disperse the external force with the protruded link portions 127. The second recess 125 formed inside the protruded link portion 127 is for reducing the weight and preferably be formed in a circular or an elliptical shape.

In addition, a third recess 129 formed by the protruded ring portions 123 and protruded link portions 127 forms a honeycomb shape upon rounding the connecting portions of protruded ring portions 123 and protruded link portions 127. In this way, the third recess 129 formed in the honeycomb shape is configured to have smooth curves so that a portion in terms of volume or weight can be removed effectively from the rim portion 100 without sacrificing durability of the protruded grid portion 120.

In accordance with embodiments of the present invention, manufacturing can be easily done even by using a conventional casting method. According to the method, an upper mold (not shown), a lower mold (not shown), and side molds (not shown) are separately made, wherein the side molds are formed in four segments having inner circumferential shapes configured to form the protruded grid portion 120 on the circumference of the rim portion 100 of the wheel.

Therefore, the honeycomb rim-type wheel 1 of the present invention can conveniently be manufactured by using molds with only the side molds replaced without the need for an additional manufacturing process. In addition, as the rim portion 100 is formed in a honeycomb type by the protruded grid portion 120 comprised of the protruded ring portions 123 forming the first recesses 121, the protruded link portions 127 forming the second recesses 125, and the third recesses 129 having honeycomb shape, the durability of the honeycomb rim-type wheel 1 of the present invention cannot be deteriorated, and the time and cost of manufacturing can be reduced due to the reduced usage of molten metal.

On the other hand, the inventors have performed a finite element analysis (FEA) to verify the performance of the honeycomb rim-type wheel 1 of the present invention. Performed FEA on three types of wheels includes impact tests, rotational fatigue tests, and driving tests. The FEA conditions are described below in Table 1.

TABLE 1

| FEA conditions | Impact test (13° method) | Test pressure | 582 Kgf |
|---|---|---|---|
| | | Tire size | 245/40 R19 |
| | Driving test | Test pressure | 1,328 Kgf |
| | | Tire size | 245/40 R19 |
| | Rotational fatigue test | Test pressure | 300 Kgf |

The FEA test results on three types of wheels are shown in FIG. 3 through FIG. 6, and FIG. 6 summarizes the results.

As can be seen in FIG. 3 through FIG. 6, compared with the Type 1 wheel having a conventional rim portion, Type 2 and Type 3 wheels of honeycomb rim-type of the present invention have weight reductions by 802 g, i.e., 5.44%, and 965 g, i.e., 6.55%, respectively.

In addition, according to the impact tests, the strains of Type 2 and 3 in the maximum plastic deformation region showed a slight increase by 0.13~0.24% to be 6.81% and 6.70%, respectively, compared with Type 1, which is much lower than the guideline, that is, below 10% of the maximum strain. It can be seen that no durability issue is present as the increases of strain are quite small as compared with that of Type 1.

In addition, the stress concentration of Type 2 and 3 according to the driving test showed a slight increase by 5.29 MPa and 3.19 MPa to be 75.90 MPa and 73.80 MPa, respectively, as compared with Type 1, which is much lower than the guideline, that is, below 115.2 MPa of the maximum stress concentration as was in case of the maximum strain.

It can be seen that no durability issue is present as the increases in stress concentration are quite small as compared with that of Type 1.

In addition, the stress concentrations of Type 2 and 3 according to the rotational fatigue test showed a slight increase by 2.33 MPa and 2.43 MPa to be 66.50 MPa and 66.60 MPa, respectively, as compared with Type 1, which is also much lower than the guideline, that is, below 151.7 MPa of the maximum stress concentration. It can be seen that no durability issue is present as the increases in stress concentration are quite small as compared with that of Type 1.

As discussed above, the honeycomb rim-type wheel 1 of the present invention can be manufactured conveniently using a conventional casting method without sacrificing durability thanks to the protruded grid portion 120 on the circumference of the air-tight rim 110, thereby reducing time and cost for manufacturing by reduced usage of molten metal.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

The invention claimed is:

1. A honeycomb rim-type wheel, comprising:
a hub formed inside the wheel;
a rim portion separated outwardly from the hub and a circumference on which a tire is fitted; and
a plurality of spokes connecting the hub and the rim portion,
wherein the rim portion includes an air-tight rim formed in a cylindrical shape, and a protruded grid portion protruding from the air-tight rim, the grid portion having a plurality of first recesses,
wherein the air-tight rim of the rim portion has a thickness ranging from 1 mm to 1.5 mm, and the protruded grid portion has a thickness ranging from 2.5 mm to 3 mm so that the overall thickness of the rim portion including the air-tight rim and the protruded grid portion becomes equal to or less than 4 mm.

2. A honeycomb rim-type wheel, comprising:
a hub formed inside the wheel;
a rim portion separated outwardly from the hub and having a circumference on which a tire is fitted; and
a plurality of spokes connecting the hub and the rim portion,
wherein the rim portion includes an air-tight rim formed in a cylindrical shape, and a protruded grid portion protruding from the air-tight rim, the grid portion having a plurality of first recesses equispaced around the circumference of the air-tight rim,
wherein the protruded grid portion is integrally formed through connections of protruded ring portions which are equispaced around the circumference of the air-tight rim, the protruded ring portions being connected by protruded link portions, the protruded link portions having a second recess disposed on sides of the protruded ring portion; and
a third recess formed by the protruded ring portions and protruded link portions the third recess having a honeycomb shape, wherein the connecting portions of protruded ring portions and protruded link portions are rounded.

* * * * *